US009328459B2

(12) United States Patent
Weerawarna

(10) Patent No.: US 9,328,459 B2
(45) Date of Patent: May 3, 2016

(54) MULTI-STAGE CATALYTIC CARBOXYLATION OF MERCERIZED CELLULOSE FIBERS

(71) Applicant: WEYERHAEUSER NR COMPANY, Federal Way, WA (US)

(72) Inventor: S. Ananda Weerawarna, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 188 days.

(21) Appl. No.: 13/853,733

(22) Filed: Mar. 29, 2013

(65) Prior Publication Data

US 2014/0290882 A1    Oct. 2, 2014

(51) Int. Cl.
| | |
|---|---|
| D21H 11/20 | (2006.01) |
| D21H 13/04 | (2006.01) |
| D21C 9/00 | (2006.01) |
| C08B 15/04 | (2006.01) |
| D06M 13/355 | (2006.01) |
| D06M 13/388 | (2006.01) |
| D06M 101/06 | (2006.01) |

(52) U.S. Cl.
CPC ............... *D21C 9/005* (2013.01); *C08B 15/04* (2013.01); *D06M 13/355* (2013.01); *D06M 13/388* (2013.01); *D21H 11/20* (2013.01); *D21H 13/04* (2013.01); *D06M 2101/06* (2013.01)

(58) Field of Classification Search
CPC ................................ D21C 9/005; C08B 15/04
USPC .......................................... 536/124, 56; 106/9
See application file for complete search history.

(56) References Cited

U.S. PATENT DOCUMENTS

| | | | |
|---|---|---|---|
| 6,379,494 B1 * | 4/2002 | Jewell et al. ............... | 162/9 |
| 6,471,824 B1 | 10/2002 | Jewell et al. | |
| 6,524,348 B1 | 2/2003 | Jewell et al. | |
| 6,582,557 B2 | 6/2003 | Jewell | |
| 6,592,717 B2 | 7/2003 | Jewell | |
| 6,852,860 B2 | 2/2005 | Weerawarna et al. | |
| 6,919,447 B2 | 7/2005 | Komen et al. | |
| 7,001,483 B2 | 2/2006 | Severeid et al. | |
| 7,109,325 B2 | 9/2006 | Komen et al. | |
| 7,135,557 B2 | 11/2006 | Weerawarna et al. | |
| 2002/0098317 A1 | 7/2002 | Jaschinski et al. | |
| 2003/0054167 A1* | 3/2003 | Wang ............................ | 428/364 |
| 2005/0028953 A1 | 2/2005 | Severeid et al. | |
| 2005/0029292 A1 | 2/2005 | Ophardt | |
| 2014/0249305 A1 | 9/2014 | Tanaka et al. | |

FOREIGN PATENT DOCUMENTS

WO          0050462 A1     8/2000

OTHER PUBLICATIONS

Jinpo et al, JP 11012301 A, Country Japan, (Derwent Abstract) Date—Jan. 1999.*
Schenzel, Karla, et al., Quantitative analysis of the transformation process of celluslo I > cellulose II using NIR FT Raman spectroscopy and chemometric methods, Cellulose (2009) 16:407-415; DOI 10.1007/s10570-009-9286-0.
Database WPI, Week 201323, Thomson Scientific, London, GB; AN 2013-E15979 (Mar. 21, 2013).
Kitaoka T, et al., "Chemical Modification of Pulp Fibers by Tempo-Mediated Oxidation," Nordic Pulp and Paper Research Journal, Stockholm, SE, vol. 14, No. 4, Jan. 1, 1999, pp. 279-284, XP0009207878.
Praskalo-Milanovic, J Z, et al., "Silver-Loaded Lyocell Fibers Modified by TEMPO-Mediated Oxidation," Journal of Applied Polymer Science, Wiley, US, vol. 117, No. 3, Jan. 1, 2010, pp. 1772-1779, XP007913051, ISSN: 0021-8995, DOI: 10.1002/APP.32128.

* cited by examiner

*Primary Examiner* — Scarlett Goon
*Assistant Examiner* — Everett White
(74) *Attorney, Agent, or Firm* — Weyerhaeuser Law Dept; Timothy M. Whalen

(57) ABSTRACT

Carboxylated, mercerized cellulose fiber having at least 12 meq/100 g of carboxyl substitution at the C-6 position of the anhydroglucose units, which includes at least 20% cellulose II, may be produced by catalytically carboxylating mercerized cellulose fiber in at least two catalytic carboxylation stages in a continuous series in which the pH is adjusted, and a primary oxoammonium salt catalyst (or precursor thereof) and secondary oxidant is added, at the beginning of each stage. Optionally, the carboxylated, mercerized cellulose may be made substantially free of aldehyde groups by means of a stabilizing step following the final carboxylation stage, in which aldehyde groups present in the fibers are converted to carboxyl groups.

13 Claims, 1 Drawing Sheet

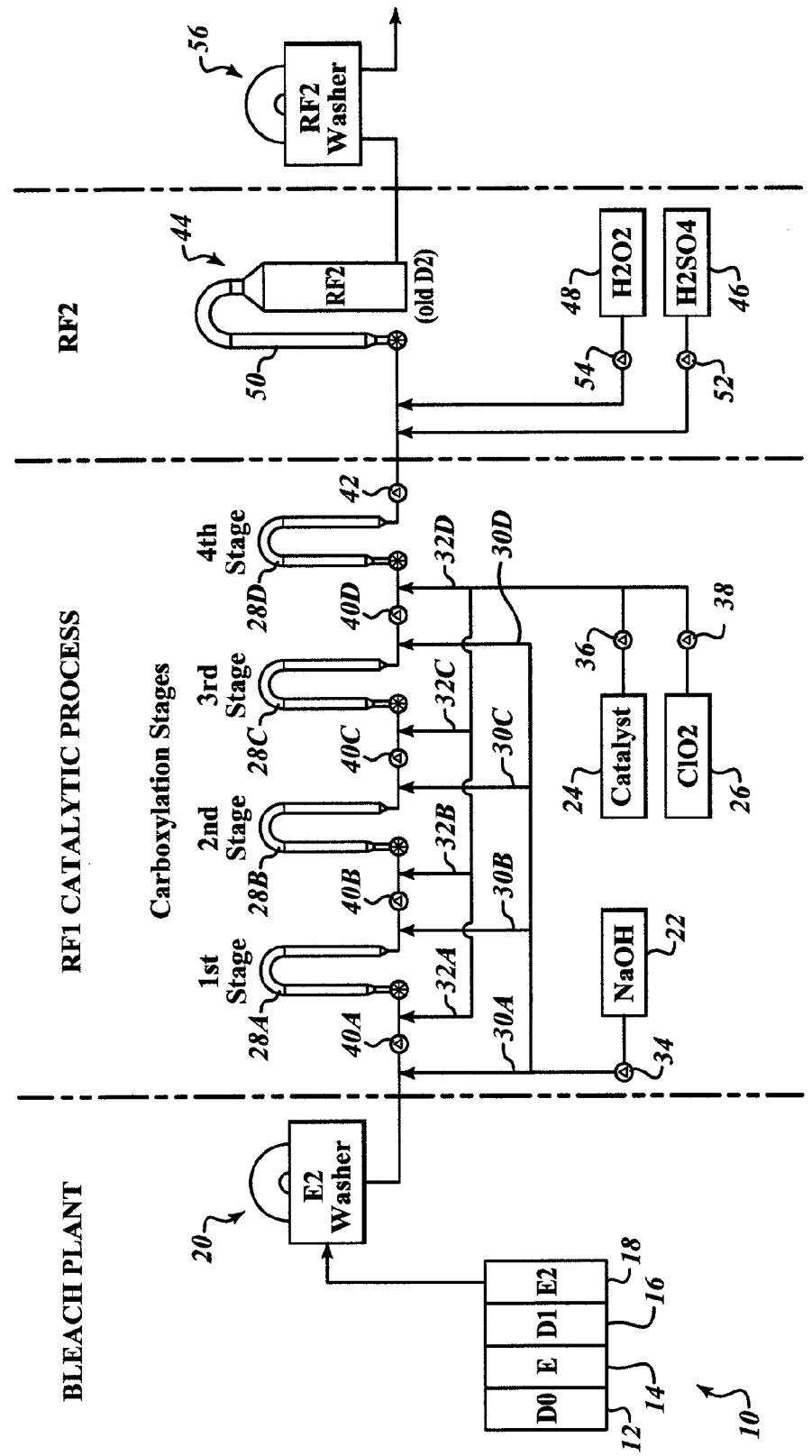

MULTI-STAGE CATALYTIC CARBOXYLATION OF MERCERIZED CELLULOSE FIBERS

TECHNICAL FIELD

This disclosure relates to carboxylation of cellulose, and in particular to methods of preparing stable, fibrous, mercerized and carboxylated cellulose by multi-stage catalytic carboxylation, and the compositions produced thereby.

BACKGROUND

In one technique of carboxylating cellulose fiber, bleached cellulose wood pulp fiber is carboxylated in an aqueous slurry or suspension by addition of a primary oxidizer consisting of a cyclic nitroxide lacking any substitutable hydrogen atoms on either of the carbon atoms adjacent the nitroxide nitrogen. Nitroxides having both five- and six-membered rings have been found to be satisfactory. Both five- and six-membered rings may have either a methylene group or another heterocyclic atom (eg. nitrogen or oxygen) at the 4-position in the ring, and both rings may have substituent groups at this location.

A nitroxide catalyst added to the reaction medium is rapidly converted to the oxoammonium salt (primary oxidant) by a secondary oxidant such as chlorine dioxide. The oxoammonium ion then binds to a primary hydroxyl group or a hydrated C-6 aldehyde hydroxyl group of an anhydroglucose unit of cellulose on a cellulose fiber. In one proposed literature reaction mechanism, a hydroxide ion then abstracts a proton, thus breaking a carbon-hydrogen bond at the 6-position of the anhydroglucose unit undergoing oxidation. A molecule of the hydroxylamine form of the nitroxide is generated with the formation of each aldehyde group from a primary alcohol group or formation of each carboxyl group from a hydrated aldehyde group. The hydroxylamine form must then be converted to the nitroxide form by a single electron transfer to a chlorine dioxide molecule. The nitroxide form of the catalyst must then be converted (oxidized) to the oxoammonium salt form (active catalyst and primary oxidant) by a single electron transfer to chlorine dioxide. In each case, chlorine dioxide is reduced to chlorite ion.

The nitroxides may be formed in situ by oxidation of the respective hydroxylamines or amines. Oxoammonium salts of nitroxides are generated by oxidation of nitroxides in situ by the secondary oxidant. The oxoammonium salt of the nitroxide is the primary oxidant as well as the active catalyst for carboxylation of cellulose. Oxoammonium salts are generally unstable and have to be generated in situ from more stable nitroxide hydroxylamine or amine precursors. The nitroxide is converted to an oxoammonium salt, then undergoes reduction to a hydroxylamine during the cellulose carboxylation reactions. The oxoammonium salt is continuously regenerated by the presence of a secondary oxidant, such as chlorine dioxide. In general, since the nitroxide is not irreversibly consumed in the oxidation reaction, only a small amount of it is required. Rather, during the course of the reaction, it is the secondary oxidant which will deplete.

In cellulose carboxylation processes, elements of concern include the length of reaction time to provide the required carboxylation, and the amount of retention storage capacity in the catalytic carboxylation reactor required for that reaction time. A longer reaction time requires more retention storage capacity in the catalytic carboxylation reactor. Other elements of concern include reagent concentrations (e.g., of catalyst, secondary oxidant, and so forth), optimum reaction conditions (e.g., pH and temperature), and so forth.

If added carboxyl level of 2-12 milliequivalents (meq) per 100 g of oven dry (OD) cellulose fiber is desired, a single catalytic reaction with short reaction time and minimum retention storage capacity is generally sufficient. However, for many applications of carboxylated fibrous cellulose, higher levels of carboxylation, e.g. 20 meq, 40 meq, 100 meq, or even higher meq/100 g, are preferable.

It had been thought that only one addition of primary oxidant or catalyst at the beginning of the reaction would be sufficient to achieve a desired level of carboxylation because the regeneration of the primary oxidant would allow it to be reused.

However, as described in the inventor's co-pending U.S. patent application Ser. No. 13/604,331, the entire disclosure of which is incorporated herein by reference, it was discovered that it is more difficult to regenerate the active catalyst (i.e., the oxoammonium salt from the hydroxylamine precursor) as the carboxylation reaction continues, and that it is more difficult for the regenerated catalyst to find reactive sites on the cellulose as the carboxylation reaction continues.

Accordingly, in the aforementioned application, carboxylation methods in which both the primary oxidant and the secondary oxidant are supplied at intervals are disclosed. In particular, high levels of carboxylation of native (i.e. non-mercerized) cellulose fibers were achieved in a fast-flowing, continuous process using multiple catalytic carboxylation reactors with short reaction times (e.g., under 5 minutes) and therefore low retention storage volumes.

A continuing challenge, however, is to provide increased levels of carboxylation in a more cost-effective manner.

SUMMARY

Bleached and mercerized cellulose fibers containing both cellulose I and cellulose II forms and lower crystallinity are more reactive towards catalytic carboxylation than native (non-mercerized) bleached cellulose fibers containing only cellulose I with higher crystallinity, and provide highly carboxylated cellulose fibers (greater than 20 meq/100 g of fibers) containing both cellulose I and cellulose II forms more readily with short reaction times.

Methods of multi-stage catalytic carboxylation of mercerized cellulose fibers, and the compositions produced thereby, are disclosed.

In example methods in accordance with the present disclosure, mercerized cellulose fibers are carboxylated by catalytic carboxylation in an aqueous alkaline suspension in a continuous series of at least two successive carboxylation stages, carboxylating the mercerized fibers at the C-6 position of the anhydroglucose unit, with each later stage further carboxylating the fibers from the previous stage. In each stage, pH is adjusted to about 8-11, and fresh amounts of a precursor of an active oxoammonium salt catalyst and a secondary oxidant adapted to generate the active catalyst sufficient to effect carboxylation are added. The precursor is selected from the group consisting of heterocyclic nitroxides in which the carbon atoms adjacent the nitroxide nitrogen lack hydrogen substitution, their corresponding amines and hydroxylamines, and mixtures thereof, and is stable under aqueous alkaline conditions. In some methods, subsequent to the last catalytic carboxylation stage, the mercerized, carboxylated fibers are stabilized by treating the fibers with a stabilizing agent under conditions adapted to convert aldehyde groups present in the fibers to carboxyl groups, such as in a stabilizing tower under acidic conditions at times and temperatures suitable to effect stabilization.

Example compositions in accordance with the present disclosure include stable, fibrous, carboxylated, mercerized cellulose having at least 12 meq/100 g carboxyl substitution, wherein the carboxyl groups are located at the C-6 position of the anhydroglucose units. In some compositions, the mercerized cellulose includes at least 20% cellulose II. In some compositions, the mercerized cellulose has at least 40 meq/100 g, or even at least 80 meq/100 g, of carboxyl substitution. In some compositions, the mercerized cellulose is substantially free of aldehyde groups.

The concepts, features, methods, and component configurations briefly described above are clarified with reference to the accompanying drawings and detailed description below.

BRIEF DESCRIPTION OF THE DRAWINGS

FIG. 1 is a partially schematic diagram of an example four stage carboxylation system suitable for performing methods, and producing compositions, in accordance with the present disclosure.

DETAILED DESCRIPTION

Example methods according to the present disclosure achieve high levels of carboxylation (18-100 or higher meq/100 g) of cellulose fiber in the form of bleached and mercerized cellulose wood pulp fiber, in a fast-flowing, continuous process using multiple catalytic carboxylation reactors with short reaction times (e.g., under 5 minutes) and therefore low retention storage volumes.

Various methods of multi-stage catalytic carboxylation of native cellulose fibers are disclosed in the inventor's aforementioned co-pending application, including methods using native cellulose fiber as a starting material, TEMPO and/or TAA-EGK-NO as the catalyst, and chlorine dioxide as a secondary oxidant. The rate of carboxylation, however, tends to slow down as higher levels of catalytic oxidation of the C-6 hydroxyl group takes place, e.g. above about 40 meq/100 g. Without being bound by theory, it is thought that the increased reaction times in later carboxylation stages are attributable, at least in part, to a decrease of readily-accessible oxidation sites. In particular, it is thought that carboxylation initially occurs mainly on the fiber surface, with the active catalyst then accessing microfibrils throughout the cellulose fiber wall.

The inventor has discovered, however, that mercerization of native cellulose fibers produces a starting material that is more reactive in a continuous catalytic carboxylation process with multiple catalytic stages, as compared to a starting material composed of only native cellulose fibers. The higher reactivity of at least partially mercerized native cellulose fibers (e.g., fibers consisting of more than about 20% cellulose II) results in higher carboxylation rates in catalytic reactors with a retention time of less than about 5 minutes.

Cellulose is biosynthesized in a meta stable form, cellulose I, consisting of crystalline microfibrils and amorphous domains. As such, native cellulose consists entirely of cellulose I, which can be made to undergo an irreversible transition to a more thermodynamically stable form, cellulose II, as the result of a chemical process referred to as mercerization. Mercerization entails treatment of cellulose with a mercerizing agent, such as an aqueous alkali metal hydroxide solution of sufficient concentration (e.g., aqueous NaOH having a concentration of at least 11 wt %) to effect intracrystalline swelling, followed by recovery, such as by removing or neutralizing the mercerizing agent and washing the mercerized fiber. Variables in the mercerization process (e.g., alkaline concentration, temperature, treatment time, and so forth) can be controlled in order to produce partially mercerized fiber, that is, fiber consisting of both cellulose I and cellulose II. Herein, mercerization is also referred to as "alkalization," and denotes that at least some of the cellulose I form has been converted to cellulose II. In other words, "mercerized" is used herein to refer to native cellulose that has been at least partially converted to cellulose II.

The inventor has discovered that native cellulose pulp fibers below a consistency of about 4% in sodium hydroxide concentrations of about 11-25% yields partially mercerized cellulose pulp fibers that may be catalytically oxidized in a multi-stage continuous process to produce partially mercerized and highly carboxylated cellulose fibers. Without being bound by theory, it is thought that the increased reactivity of partially mercerized native cellulose fibers is, at least in part, attributable to reduced crystallinity of the fibers (as compared with native cellulose fibers consisting of cellulose I).

Accordingly, methods according to the present disclosure provide additional carboxyl groups to a bleached and mercerized cellulose wood pulp fiber to provide a carboxylated cellulose wood pulp fiber. For example, in some methods, northern bleached softwood kraft pulp (NBSK) that has been pre-mercerized, such as NBSK that has been treated with a suitable mercerizing agent, is used as a starting material. In some methods, pre-mercerized southern bleached softwood kraft pulp (SBSK) is used. Bleached cellulose wood pulp fibers typically have a carboxyl content of 5 or below meq/100 g. As noted above, some uses of carboxylated cellulose wood pulp fiber require higher levels of carboxylation. Accordingly, such methods may be employed to provide such high levels of carboxylation. In one embodiment the process provides a mercerized cellulose wood pulp fiber that has a total carboxyl content of up to 150 meq/100 g. In another embodiment the process provides a mercerized cellulose wood pulp fiber that has a total carboxyl content of up to 100 meq/100 g. In another embodiment the process provides a mercerized cellulose wood pulp fiber that has a total carboxyl content of up to 70 meq/100 g. In another embodiment the process provides a mercerized cellulose wood pulp fiber that has a total carboxyl content of up to 50 meq/100 g. In another embodiment the mercerized cellulose wood pulp fiber has a total carboxyl content of up to 40 meq/100 g. In another embodiment the mercerized cellulose wood pulp fiber has a total carboxyl content of 25 to 30 meq/100 g.

The wood for the wood pulp fibers may be any softwood or hardwood, including pine, spruce, larch, Douglas fir, fir, hemlock, cedar, redwood, aspen, basswood, beech, birch, cottonwood, gum, maple, ash, chestnut, elm, eucalyptus, mixtures thereof, and so forth. The wood may be pulped by any standard pulping process such as kraft or sulfite. The wood pulp fiber then may be bleached by any standard bleaching process.

In methods according to the present disclosure, the starting material is at least partially mercerized cellulose fiber, such as fiber consisting of at least about 20% cellulose II. The starting material in such methods may be obtained as partially mercerized cellulose pulp fiber having a desired proportion of cellulose II, or may be produced by means of an alkalization process performed on native cellulose pulp fiber.

Although in general, the wood for the wood pulp fibers may be as indicated above, and any suitable mercerizing agent(s) in any suitable mercerization procedure may be used, it was found that performing the alkalization with native NBSK cellulose fibers below about 4% consistency in aqueous sodium hydroxide concentrations of 14-18% at 50° C. or higher over 15-30 minute periods yields partially mercerized (e.g., with at least about 20% cellulose II) pulps of faster reactivity toward catalytic carboxylation. Performing the alkalization at lower temperatures generally requires longer storage times to achieve equivalent mercerization levels. For example, alkalization at sodium hydroxide concentrations of 9-18% below about 40° C. requires about 10-12 hours to obtain partially mercerized pulps exhibiting similarly increased reactivity.

In such methods, the bleached, mercerized cellulose wood pulp fiber is carboxylated by means of multi-stage catalytic carboxylation. This process is generally effected by first oxidizing the mercerized fiber in an aqueous slurry or suspension by addition of a primary oxidizer comprising a cyclic nitroxide lacking any hydrogen substitution on either of the carbon atoms adjacent the nitroxide nitrogen. Nitroxides having both five and six membered rings have been found to be satisfactory. Both five and six membered rings may have either a methylene group or another heterocyclic atom selected from nitrogen or oxygen at the four position in the ring, and both rings may have substituent groups at this location. It is important that the nitroxide chosen be stable in an aqueous alkaline environment in the range of about pH 8-11.

A large group of nitroxide compounds have been found to be suitable. Examples include 2,2,6,6-tetramethylpiperidinyl-1-oxy free radical (TEMPO), as well as 2,2,2'2',6,6,6',6'-octamethyl-4,4'-bipiperidinyl-1,1'-dioxy di-free radical (BI-TEMPO, a product linked in a mirror image relationship to TEMPO), and compounds with substitution at the 4-position of TEMPO, such as 2,2,6,6-tetramethyl-4-hydroxypiperidinyl-1-oxy free radical, 2,2,6,6-tetramethyl-4-methoxypiperidinyl-1-oxy free radical, 2,2,6,6-tetramethyl-4-benzyloxypiperidinyl-1-oxy free radical, 2,2,6,6-tetramethyl-4-aminopiperidinyl-1-oxy free radical, 2,2,6,6-tetramethyl-4-acetylaminopiperidinyl-1-oxy free radical, and 2,2,6,6-tetramethyl-4-piperidone-1-oxy free radical. Further examples include 3,3,5,5-tetramethylmorpholine-1-oxy free radical (TEMMO), a nitroxide with a second hetero atom in the ring at the 4-position (relative to the nitrogen atom), 3,4-dehydro-2,2,6,6-tetramethyl-piperidinyl-1-oxy free radical, a nitroxide that does not have a saturated ring, and so forth. Additionally, six-membered ring compounds with double substitution at the 4-position are suitable and may be preferred in some cases because of their relative ease of synthesis and lower cost. An example of such a compound is triacetoamine ethylene glycol ketal nitroxide (TAA-EGK-NO), the ethylene cyclic ketal of 2,2,6,6-tetramethyl-4-piperidone-1-oxy free radical; other examples of such compounds include ethylene, propylene, and neopentyl cyclic acetals of the 2,2,6,6-tetramethyl-4-piperidone-1-oxy free radical. An example suitable five-membered ring compound is 2,2,5,5-tetramethyl-pyrrolidinyl-1-oxy free radical.

The above named compounds should only be considered as examples of the many representatives of the nitroxides suitable for use.

The nitroxides suitable for use in the methods disclosed herein may be formed in situ by oxidation of the corresponding hydroxylamines and/or respective amines of any of the nitroxide free radical products. The active form of the catalyst, or primary oxidant, in such catalytic oxidation reactions are the oxoammonium (also spelled "oxammonium") salts of the nitroxides, which are generated from the nitroxides (and, as noted above, the nitroxides are generated from respective hydroxylamine/amines), generally by a secondary oxidant such as chlorine dioxide. In general, the nitroxide is not irreversibly consumed in the oxidation reaction, and therefore only a small amount of it is required. Rather, it is the secondary oxidant that is depleted during the course of the reaction. In one embodiment, the amount of nitroxide required is in the range of about 0.005% to 1.0% based on the amount of cellulose present. In another embodiment, the amount of nitroxide required is about 0.02-0.25%. The nitroxide is known to preferentially oxidize the primary hydroxyl located on C-6 of the anhydroglucose moiety of cellulose.

In the experiments discussed herein, either TEMPO or TAA-EGK-NO is used as the nitroxide.

The nitroxide may first be premixed with a portion of an aqueous chlorine dioxide to form a homogeneous solution before addition to the mercerized fiber slurry. Optionally, ultrasonic agitation may be employed, for example to increase dissolution rate. The carboxylation reaction may be allowed to continue over a time period from about 10 seconds to 5 minutes. In one embodiment the temperature is from 0 to 75° C. In other embodiments the temperature is 0° to 50° C. In another embodiment the temperature is room temperature. The temperature of the reaction will depend on some competing considerations. For example, a higher temperature will increase the reaction rate but will reduce the D.P. of the cellulose and may also degrade chlorine dioxide at high alkaline pH.

In general, the mercerized fiber slurry passes through several catalytic carboxylation reactors, with a fresh addition of catalyst, secondary oxidizing agent, and, if necessary, a pH-adjusting chemical (typically, an alkaline buffer solution) at the entry to each catalytic carboxylation reactor. The active catalyst is the oxoammonium ion generated from a hindered cyclic amine compound described above. The nitroxide can be obtained by oxidation of the corresponding hydroxylamine or the amine. The time in each stage, and the size of each stage, will depend upon the speed of the reaction within the stage. The number of stages will depend upon the amount of carboxylation required. Based on experiments, it is estimated that approximately one catalytic carboxylation reactor is required for each 10 meq/100 g addition of carboxyl groups required on the mercerized cellulose fibers.

In the multi-stage catalytic carboxylation methods of the present disclosure, chlorine dioxide is typically used as the secondary oxidant, but sodium hypochlorite or sodium bromide, or combinations thereof, may alternatively be used; and still other alternatives include Caro's acid sodium or potassium salts combined with sodium bromide, or peracetic acid sodium or potassium salts combined with sodium bromide, and so forth. In the experiments discussed herein, chlorine dioxide, a mixture of chlorine dioxide and chlorine, or a mixture of sodium hypochlorite and sodium bromide, is used as the secondary oxidizing agent. The buffer solution is typically a sodium hydroxide solution, but sodium bicarbonate or carbonate, or mixtures thereof, may used for pH adjustment and control within a narrow pH range. In one embodiment, the pH range is 8-11. In another embodiment, the pH range is 9.25-10.5.

In practice, the series of catalytic carboxylation reactors may be a main pipe or a series of pipes with valved addition pipes bringing in the chlorine dioxide, catalyst and sodium hydroxide solution to the pipe(s). The valves on the addition pipes can be used to change the addition of the carboxylation chemicals in a catalytic carboxylation reactor to the amount of carboxylation required in the catalytic carboxylation reactor. The time spent in each catalytic carboxylation reactor or section can be from 10 seconds to 5 minutes, as needed. In one embodiment, the pH is adjusted to 8-10 by the addition of a base chemical prior to the next catalytic stage. In another embodiment, the pH is adjusted to 8-9 by the addition of the base chemical.

Following catalytic carboxylation, the fiber is treated with a stabilizing agent adapted to convert substituent groups, such as aldehydes and ketones, to hydroxyl or carboxyl groups. Unstabilized nitroxide oxidized pulps may exhibit objectionable color reversion and are subject to self-crosslinking upon drying, thereby reducing their ability to redisperse.

Suitable stabilizing agents include reducing agents or one or more additional oxidizing agents. Example reducing agents include alkali metal borohydrides. Sodium borohydride ($NaBH_4$) is favorable from the standpoint of cost and availability. However, other borohydrides such as $LiBH_4$, or alkali metal cyanoborohydrides such as $NaBH_3CN$ are also suitable. Mixtures are also suitable, such as $NaBH_4$ mixed with LiCl to form a reducing agent. When $NaBH_4$ is used for reduction, it is generally present in an amount between about 0.1 and 100 g/L. A preferred amount would be about 0.25-5.0 g/L and a more preferred amount from about 0.5-2.0 g/L. Based on cellulose content, the amount of reducing agent should be in the range of about 0.1% to 4.0% by weight, preferably about 1.0-3.0%. Reduction may be carried out at room or higher temperature for a time between 10 minutes and 10 hours, preferably about 30 minutes to 2 hours.

Suitable oxidizing agents used as stabilizers include alkali metal chlorites, such as sodium chlorite, which may be favorable because of comparatively lower cost. Other compounds that may serve well as oxidizers include permanganates, chromic acid, bromine, and silver oxide. A combination of chlorine dioxide and hydrogen peroxide is also a suitable oxidizer, such as when used at the pH range designated for sodium chlorite. Oxidation using sodium chlorite may be carried out at a pH in the range of about 1.5-5.0, preferably 2.0-4.0, at temperatures between about 25°-90° C. for times from about 5 minutes to 50 hours, preferably about 10 minutes to 2 hours. One factor that may favor the use of an oxidizing agent as opposed to a reducing agent is the desired end result of a stabilizing step. For example, when an oxidizing agent is used, aldehyde groups on the oxidized cellulose are converted to additional carboxyl groups, thus resulting in a more highly carboxylated product. Such stabilizing oxidizers are sometimes referred to as "tertiary oxidizers" to distinguish them from the oxoammonium salt of the nitroxide and chlorine dioxide primary and secondary oxidizers. Such "tertiary oxidizers" are used in a molar ratio of about 1.0-15 times the presumed aldehyde content of the oxidized cellulose, preferably about 5-10 times. In a more convenient way of measuring the required tertiary oxidizer needed, the preferred sodium chlorite usage should fall within about 0.001 g sodium chlorite/g of fiber to 0.2 g/g, preferably 0.01-0.09 g/g, the chlorite being calculated on a 100% active material basis.

In practice, the oxidized, mercerized fiber slurry exiting the last catalytic carboxylation reactor may subsequently enter a single stabilization tower for an acidic stabilization step, in which any aldehyde groups remaining in the oxidized cellulose pulp fibers are converted to carboxyl groups. At the end of the stabilization stage, the fiber slurry is neutralized, washed, dewatered and dried.

Optionally, stabilization may be bypassed, for example to obtain aldehyde and carboxyl functional group containing partially mercerized cellulose fibers.

After stabilization is (optionally) completed, the cellulose is again washed and may be dried if desired. Alternatively, the carboxyl substituents may be converted to other salt forms besides sodium; e.g., potassium, calcium, magnesium, or ammonium.

In experiments employing the methods discussed above, catalytic carboxylation of mercerized cellulose fibers in water using a multiple catalytic carboxylation reactors has been used to obtain different levels of carboxylation per 100 g oven dried (OD) fibers. The catalytic processes used hindered nitroxides, and/or their precursor amines or hydroxylamines, to obtain the oxidized oxoammonium salt as the primary catalyst. The secondary catalyst used was chlorine dioxide. In the catalytic oxidation processes, suitable levels of catalyst and required amount of chlorine dioxide are mixed with cellulose fibers already made alkaline. Cellulose fibers can be made alkaline using sodium (or potassium) hydroxide containing buffer solutions containing carbonate or bicarbonate. One embodiment contains mixtures of aqueous bases containing hydroxide, carbonate and bicarbonate.

A partially schematic diagram of one embodiment of a carboxylation system, in the form of a plant, is shown in FIG. 1. The catalytic carboxylation reactors, or stages, are shown as rounded because the oxidation unit represented in FIG. 1 is, in this embodiment, incorporated in an existing bleach plant (indicated generally at 10), and space is a consideration. However, other configurations of the various reactors, connections and conduits therebetween, and other components of the unit, may assume any suitable arrangement and shape. As noted above, the stages could be part of a single pipe in other embodiments consistent with this disclosure.

The last four stages of bleach plant 10 are shown. These include a first chlorine dioxide unit 12, an extraction stage 14, a second chlorine dioxide unit 16, and a second extraction stage 18. In the acidic chlorine dioxide stages 12 and 16, chlorine dioxide reacts with the lignin and hemicellulose in a wood pulp slurry to form a reaction product, and in the alkaline extraction stages 14 and 18 the reaction product is removed by treatment with sodium hydroxide. The pulp slurry from extraction stage 18 flows to a washer 20 in which the soluble reaction products are removed from the pulp. Mercerization of cellulose fibers may be performed in either of extraction stages 14, 18, or in an additional stage not shown in FIG. 1, such as an additional extraction stage/unit or any suitable mercerization stage/unit located upstream or downstream of washer 20, may be used for mercerization of cellulose fibers prior to catalytic carboxylation. Depending on the mercerization method, additional structural components, such as reactors, baths, and so forth, may be incorporated into the configuration shown in FIG. 1. Optionally, in some embodiments, mercerized cellulose fibers suitable for catalytic carboxylation are obtained by other methods, by separate systems, and so forth.

The mercerized pulp slurry then enters the catalytic carboxylation reactors in which the pulp fiber is treated. Four catalytic carboxylation reactors or stages are shown, but there may be as many catalytic carboxylation reactors or stages as are required to obtain the amount of carboxylation needed. In general, the volume of each catalytic reactor may be determined by the mass flow rate of the pulp slurry and the required retention time for complete consumption of the added secondary oxidant. According to methods of the present disclosure, retention times of less than five minutes are suitable for each catalytic reactor. As noted in FIG. 1, e.g. "$1^{st}$ Stage," "$2^{nd}$ Stage," etc., the catalytic carboxylation reactors or stages are in series, and the pulp slurry flows through them from the first catalytic carboxylation stage through the last catalytic carboxylation stage and then to further processing.

Sodium hydroxide or other base is supplied from base supply 22 to adjust pH. Catalyst from catalyst supply 24 and chlorine dioxide from secondary oxidant supply 26 are supplied to each of the catalytic carboxylation reactors 28A, 28B, 28C and 28D at the beginning of each stage. The base is supplied at 30A, 30B, 30C and 30D at the entrance to catalytic carboxylation reactors 28A, 28B, 28C and 28D, respectively. The primary oxidant, catalyst, and secondary oxidant (e.g. chlorine dioxide), are shown as being supplied at 32A, 32B, 32C and 32D at the entrance to catalytic carboxylation reactors 28A, 28B, 28C and 28D respectively. They can be supplied together, as shown, or separately to the entrance of each oxidation stage.

There is a valve between the each of the supplies and the catalytic carboxylation reactors—valve 34 for base supply 22, valve 36 for catalyst supply 24, and valve 38 for secondary oxidant supply 26, and there are valves 40A, 40B, 40C and 40D at the entrance to each catalytic carboxylation reactor, and a valve 42 after the last catalytic carboxylation reactor.

The carboxylated fibers are then stabilized in a stabilization tower 44. A chlorine dioxide tower is shown being used for a stabilization tower. Sulfuric acid from sulfuric acid supply 46 and hydrogen peroxide from hydrogen peroxide source 48 are supplied to the oxidized pulp fibers prior to the fibers entering the upflow section 50 of the stabilization tower 40. Again, there is a valve 52 on the outlet of acid supply 46, and a valve 54 at the outlet of peroxide supply 48.

The carboxylated fibers are then neutralized at washer 56 in which the fibers are washed with a sodium hydroxide solution and dewatered. The mercerized and carboxylated cellulose fibers can be used in wet form or dried as required, and may thus be conveyed to additional downstream system components, as desired.

The following examples summarize representative experiments of mercerizing cellulose pulp fibers in accordance with the methods and concepts discussed above.

Alkalization Example 1

Alkalization of Cellulose Pulp Fiber at 35° C. for 30 Minutes

Never-dried NBSK cellulose pulp (50.0 g oven dry basis) was placed in an aqueous solution of sodium hydroxide at 9-18% concentration. Alkalization of cellulose pulp was performed at 3% fiber consistency. The fiber slurry was maintained at 35° C. with slow mixing for 30 minutes. The fiber slurry was then filtered. Fiber mass was re-slurried in 1.5 liters of deionized water and filtered. The above fiber washing procedure was repeated three times.

Alkalization Example 2

Alkalization of Cellulose Pulp Fiber at 25° C. for 12 Hours

Never-dried NBSK cellulose pulp (50.0 g oven dry basis) was placed in an aqueous solution of sodium hydroxide at 16% concentration. Alkalization of cellulose pulp was performed at 3% fiber consistency. The fiber slurry was maintained at 25° C. with slow mixing for 12 hours. The fiber slurry was then filtered. Fiber mass was re-slurried in 1.5 liters of deionized water and filtered. The above fiber washing procedure was repeated three times.

Alkalization Example 3

Alkalization of Cellulose Pulp Fibers at 50-70° C. for 30 Minutes

Never-dried NBSK cellulose pulp 50.0 g oven dry basis was placed in an aqueous solution of sodium hydroxide at 14-18% concentration. Alkalization of cellulose pulp was performed at 3% fiber consistency. The fiber slurry was maintained at 50-70° C. with slow mixing for 30 minutes. The fiber slurry was then filtered. Fiber mass was re-slurried in 1.5 liters of deionized water and filtered. The above fiber washing procedure was repeated three times.

The following examples summarize representative catalytic carboxylation experiments embodying the methods and concepts discussed above.

Example 1

CBXY-387

Catalytic Carboxylation of Mercerized NBSK Cellulose Pulp Fibers Using Chlorine Dioxide/Chlorine/TAA-EGK-NO Catalyst, 8 Catalytic Stages and One Stabilization Stage Catalytic Stage 1

To NBSK pulp fibers mercerized in 14.65% sodium hydroxide solution at 50° C. for 30 minutes, 50.0 g OD of 10% consistency was added 300 ml of deionized water containing 8.0 g of sodium bicarbonate and 2.0 g of sodium hydroxide. The pulp slurry was maintained at 28-34° C. The initial temperature of the pulp slurry was 32° C. The initial pH was 10.17. Pulp consistency 6.3%. Volume of water 750 ml.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 27 seconds. The yellow color of chlorine dioxide fades away indicating depletion. The final pH was 9.49 and the final temperature was 33° C. Pulp consistency 5.3%. Volume of water 900 ml. Catalyst concentration 0.0775 meq/liter.

Catalytic Stage 2

To the pulp slurry maintained at 28-34° C. was added 1.25 g of sodium hydroxide and mixed well. The initial pH was 10.06 and temperature was 33° C.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 29 seconds. The yellow color of chlorine dioxide fades away indicating depletion. The final pH was 9.33 and the final temperature was 32° C. Pulp consistency 4.5%. Volume of water 1050 ml. Catalyst concentration 0.1328 meq/liter.

Catalytic Stage 3

To the pulp slurry maintained at 28-34° C. was added 1.50 g of sodium hydroxide and mixed well. The initial pH was 10.10 and temperature was 32° C.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 25 seconds. The yellow color of chlorine dioxide fades away indicating depletion. The final pH was 9.35 and the final temperature was 32° C. Pulp consistency 4.0%. Volume of water 1200 ml. Catalyst concentration 0.1744 meq/liter.

Catalytic Stage 4

To the pulp slurry maintained at 28-34° C. was added 1.50 g of sodium hydroxide and mixed well. The initial pH was 10.02 and temperature was 34° C.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 29 seconds. The yellow color of chlorine dioxide fades away indicating depletion. The final pH was 9.28 and the final temperature was 32° C. Pulp consistency 3.6%. Volume of water 1350 ml. Catalyst concentration 0.2067 meq/liter.

Catalytic Stage 5

To the pulp slurry maintained at 28-34° C. was added 1.75 g of sodium hydroxide and mixed well. The initial pH was 10.11 and temperature was 33° C.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 34 seconds. The yellow color of chlorine dioxide fades away indicating depletion. The final pH was 9.40 and the final temperature was 32° C. Pulp consistency 3.2%. Volume of water 1500 ml. Catalyst concentration 0.2025 meq/liter.

Catalytic Stage 6

To the pulp slurry maintained at 28-34° C. was added 1.50 g of sodium hydroxide and mixed well. The initial pH was 10.09 and temperature was 29° C.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 47 seconds. The yellow color of chlorine dioxide fades away indicating depletion. The final pH was 9.50 and the final temperature was 31° C. Pulp consistency 2.9%. Volume of water 1650 ml. Catalyst concentration 0.2536 meq/liter.

Catalytic Stage 7

To the pulp slurry maintained at 28-34° C. was added 1.75 g of sodium hydroxide and mixed well. The initial pH was 10.34 and temperature was 32° C.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 70 seconds. The yellow color of chlorine dioxide fades away indicating depletion. The final pH was 9.63 and the final temperature was 31° C. Pulp consistency 2.7%. Volume of water 1800 ml. Catalyst concentration 0.2731 meq/liter.

Catalytic Stage 8

To the pulp slurry maintained at 28-34° C. was added 1.75 g of sodium hydroxide and mixed well. The initial pH was 10.41 and temperature was 32° C.

Then the catalyst TAA-EGK-NO, 0.015 g was mixed with 150 ml of 1.01% $ClO_2$ solution containing 0.28% chlorine and mixed with the pulp slurry. Time taken for depletion of chlorine dioxide was 96 seconds. The yellow color of chlorine dioxide fades away indicating depletion. The final pH was 9.64 and the final temperature was 32° C. Pulp consistency 2.5%. Volume of water 1950 ml. Catalyst concentration 0.2862 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for 12 hours at 25° C.

Neutralization Stage

The acidic pulp slurry was neutralized and made alkaline to pH 8-9.5 by addition of 10% sodium bicarbonate solution with mixing. The pulp slurry was dewatered by filtration under reduced pressure. The pulp was redispersed in 2 liters of deionized water and filtered again to remove excess salts. Carboxyl determination gave 96.14 meq carboxyl/100 g of pulp fibers.

Example 2

CBXY-350

Catalytic Carboxylation of Mercerized NBSK Cellulose Pulp Fibers Using Chlorine Dioxide/Chlorine/TAA-EGK-NO Catalyst, 4 Catalytic Stages and One Stabilization Stage Catalytic Stage 1

To NBSK pulp fibers mercerized in 16% sodium hydroxide solution at 50° C. for 30 minutes, 50.0 g OD of 10% consistency from above procedure was added 300 ml of de ionized water containing 8.0 g of sodium bicarbonate and 1.75 g of sodium hydroxide. The pulp slurry was maintained at 28-34° C. The initial temperature of the pulp slurry was 29° C. The initial pH was 10.15. Pulp consistency 6.3%. Volume of water 750 ml.

Then the catalyst TAA-EGK-NO, 0.015 g was mixed with 220 ml of 0.80% $ClO_2$ solution containing 0.24% chlorine and mixed with the pulp slurry. Time taken for depletion of chlorine dioxide was 35 seconds. The yellow color of chlorine dioxide fades away indicating depletion. The final pH was 9.40 and the final temperature was 30° C. Pulp consistency 4.9%. Volume of water 970 ml. Catalyst concentration 0.0719 meq/liter.

Catalytic Stage 2

To the pulp slurry maintained at 28-34° C. was added 1.50 g of sodium hydroxide and mixed well. The initial pH was 10.14 and temperature was 31° C.

Then the catalyst TAA-EGK-NO, 0.015 g was mixed with 220 ml of 0.80% $ClO_2$ solution containing 0.24% chlorine and mixed with the pulp slurry. Time taken for depletion of chlorine dioxide was 36 seconds. The yellow color of chlorine dioxide fades away indicating depletion. The final pH was 9.25 and the final temperature was 31° C. Pulp consistency 4.0%. Volume of water 1190 ml. Catalyst concentration 0.1172 meq/liter.

Catalytic Stage 3

To the pulp slurry maintained at 28-34° C. was added 1.70 g of sodium hydroxide and mixed well. The initial pH was 10.17 and temperature was 31° C.

Then the catalyst TAA-EGK-NO, 0.015 g was mixed with 220 ml of 0.80% $ClO_2$ solution containing 0.24% chlorine and mixed with the pulp slurry. Time taken for depletion of chlorine dioxide was 37 seconds. The yellow color of chlorine dioxide fades away indicating depletion. The final pH was 9.26 and the final temperature was 31° C. Pulp consistency 3.4%. Volume of water 1410 ml. Catalyst concentration 0.1484 meq/liter.

Catalytic Stage 4

To the pulp slurry maintained at 28-34° C. was added 1.75 g of sodium hydroxide and mixed well. The initial pH was 10.17 and temperature was 32° C.

Then the catalyst TAA-EGK-NO, 0.015 g was mixed with 220 ml of 0.80% $ClO_2$ solution containing 0.24% chlorine and mixed with the pulp slurry. Time taken for depletion of chlorine dioxide was 45 seconds. The yellow color of chlorine dioxide fades away indicating depletion. The final pH was 9.22 and the final temperature was 31° C. Pulp consistency 3.0%. Volume of water 1630 ml. Catalyst concentration 0.1712 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for 12 hours at 25° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 71.06 meq carboxyl/100 g of pulp fibers.

Example 3

CBXY-352

Catalytic Carboxylation of Mercerized NBSK Cellulose Pulp Fibers, Using Chlorine Dioxide/Chlorine/TAA-EGK-NO Catalyst, 3 Catalytic Stages and One Stabilization Stage Catalytic Stage 1

To NBSK pulp fibers mercerized in 14% sodium hydroxide solution at 70° C. for 30 minutes, 50.0 g OD of 10% consistency from above procedure was added 300 ml of de ionized water containing 8.0 g of sodium bicarbonate and 1.5 g of sodium hydroxide. The pulp slurry was maintained at 28-34° C. The initial temperature of the pulp slurry was 31° C. The initial pH was 10.19. Pulp consistency 6.3%. Volume of water 750 ml.

Then the catalyst TAA-EGK-NO, 0.015 g was mixed with 205 ml of 0.86% $ClO_2$ solution containing 0.20% chlorine and mixed with the pulp slurry. Time taken for depletion of chlorine dioxide was 36 seconds. The yellow color of chlorine dioxide fades away indicating depletion. The final pH was 9.43 and the final temperature was 28° C. Pulp consistency 5.0%. Volume of water 955 ml. Catalyst concentration 0.0730 meq/liter.

Catalytic Stage 2

To the pulp slurry maintained at 28-34° C. was added 1.50 g of sodium hydroxide and mixed well. The initial pH was 10.26 and temperature was 30° C.

Then the catalyst TAA-EGK-NO, 0.015 g was mixed with 205 ml of 0.86% $ClO_2$ solution containing 0.20% chlorine and mixed with the pulp slurry. Time taken for depletion of chlorine dioxide was 30 seconds. The yellow color of chlorine dioxide fades away indicating depletion. The final pH was 9.37 and the final temperature was 31° C. Pulp consistency 4.0%. Volume of water 1200 ml. Catalyst concentration 0.1162 meq/liter.

Catalytic Stage 3

To the pulp slurry maintained at 28-34° C. was added 1.50 g of sodium hydroxide and mixed well. The initial pH was 10.06 and temperature was 32° C.

Then the catalyst TAA-EGK-NO, 0.015 g was mixed with 205 ml of 0.86% $ClO_2$ solution containing 0.20% chlorine and mixed with the pulp slurry. Time taken for depletion of chlorine dioxide was 30 seconds. The yellow color of chlorine dioxide fades away indicating depletion. The final pH was 9.18 and the final temperature was 31° C. Pulp consistency 3.4%. Volume of water 1405 ml. Catalyst concentration 0.1489 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for one hour at 50° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 57.94 meq carboxyl/100 g of pulp fibers.

Example 4

CBXY-353

Catalytic Carboxylation of Mercerized NBSK Cellulose Pulp Fibers, Using Chlorine Dioxide/Chlorine/TAA-EGK-NO Catalyst, 2 Catalytic Stages and One Stabilization Stage Catalytic Stage 1

To NBSK pulp fibers mercerized in 14% sodium hydroxide solution at 70° C. for 30 minutes, 50.0 g OD of 10% consistency from above procedure was added 300 ml of de ionized water containing 8.0 g of sodium bicarbonate and 1.5 g of sodium hydroxide. The pulp slurry was maintained at 28-34° C. The initial temperature of the pulp slurry was 31° C. The initial pH was 10.28. Pulp consistency 6.3%. Volume of water 750 ml.

Then the catalyst TAA-EGK-NO, 0.015 g was mixed with 205 ml of 0.86% $ClO_2$ solution containing 0.21% chlorine and mixed with the pulp slurry. Time taken for depletion of chlorine dioxide was 21 seconds. The yellow color of chlorine dioxide fades away indicating depletion. The final pH was 9.71 and the final temperature was 30° C. Pulp consistency 5.0%. Volume of water 955 ml. Catalyst concentration 0.0730 meq/liter.

Catalytic Stage 2

To the pulp slurry maintained at 28-34° C. was added 0.75 g of sodium hydroxide and mixed well. The initial pH was 10.07 and temperature was 31° C.

Then the catalyst TAA-EGK-NO, 0.015 g was mixed with 205 ml of 0.86% $ClO_2$ solution containing 0.21% chlorine and mixed with the pulp slurry. Time taken for depletion of chlorine dioxide was 22 seconds. The yellow color of chlorine dioxide fades away indicating depletion. The final pH was 9.46 and the final temperature was 31° C. Pulp consistency 4.0%. Volume of water 1200 ml. Catalyst concentration 0.1162 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for one hour at 50° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 36.18 meq carboxyl/100 g of pulp fibers.

Example 5

CBXY-354

Catalytic Carboxylation of Mercerized NBSK Cellulose Pulp Fibers, Using Chlorine Dioxide/Chlorine/TAA-EGK-NO Catalyst, 1 Catalytic Stage and One Stabilization Stage Catalytic Stage 1

To NBSK pulp fibers mercerized in 14% sodium hydroxide solution at 70° C. for 30 minutes, 50.0 g OD of 10% consistency from above procedure was added 300 ml of de ionized water containing 8.0 g of sodium bicarbonate and 1.5 g of sodium hydroxide. The pulp slurry was maintained at 28-34° C. The initial temperature of the pulp slurry was 30° C. The initial pH was 10.16. Pulp consistency 6.3%. Volume of water 750 ml.

Then the catalyst TAA-EGK-NO, 0.015 g was mixed with 205 ml of 0.86% $ClO_2$ solution containing 0.21% chlorine and mixed with the pulp slurry. Time taken for depletion of chlorine dioxide was 21 seconds. The yellow color of chlorine dioxide fades away indicating depletion. The final pH was 9.71 and the final temperature was 30° C. Pulp consistency 5.0%. Volume of water 955 ml. Catalyst concentration 0.0730 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for one hour at 50° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 22.44 meq carboxyl/100 g of pulp fibers.

Example 6

CBXY-326

Catalytic Carboxylation of Mercerized NBSK Cellulose Pulp Fibers, Using Chlorine Dioxide/TAA-EGK-NO Catalyst, 2 Catalytic Stages and One Stabilization Stage Catalytic Stage 1

To NBSK pulp fibers mercerized in 14.75% sodium hydroxide solution at 70° C. for 30 minutes, 50.0 g OD of 10% consistency from above procedure was added 300 ml of de ionized water containing 8.0 g of sodium bicarbonate and 1.5 g of sodium hydroxide. The pulp slurry was maintained at 28-34° C. The initial temperature of the pulp slurry was 29° C. The initial pH was 9.99. Pulp consistency 6.3%. Volume of water 750 ml.

Then the catalyst TAA-EGK-NO, 0.015 g was mixed with 170 ml of 1.2% $ClO_2$ solution and mixed with the pulp slurry. Time taken for depletion of chlorine dioxide was 56 seconds. The yellow color of chlorine dioxide fades away indicating depletion. The final pH was 8.97 and the final temperature was 29° C. Pulp consistency 5.1%. Volume of water 920 ml. Catalyst concentration 0.0758 meq/liter.

Catalytic Stage 2

To the pulp slurry maintained at 28-34° C. was added 1.75 g of sodium hydroxide and mixed well. The initial pH was 10.09 and temperature was 30° C.

Then the catalyst TAA-EGK-NO, 0.015 g was mixed with 170 ml of 1.2% $ClO_2$ solution and mixed with the pulp slurry. Time taken for depletion of chlorine dioxide was 35 seconds. The yellow color of chlorine dioxide fades away indicating depletion. The final pH was 9.22 and the final temperature was 29° C. Pulp consistency 4.4%. Volume of water 1090 ml. Catalyst concentration 0.1280 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for one hour at 60° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 30.11 meq carboxyl/100 g of pulp fibers.

Example 7

CBXY-300

Catalytic Carboxylation of Mercerized NBSK Cellulose Pulp Fibers, Using Chlorine Dioxide/TAA-EGK-NO Catalyst, 4 Catalytic Stages and One Stabilization Stage Catalytic Stage 1

To NBSK pulp fibers mercerized in 15.8% sodium hydroxide solution at 70° C. for 30 minutes, 50.0 g OD of 10% consistency was added 300 ml of de ionized water containing 8.0 g of sodium bicarbonate and 1.0 g of sodium hydroxide. The pulp slurry was maintained at 28-34° C. The initial temperature of the pulp slurry was 29° C. The initial pH was 9.71. Pulp consistency 6.3%. Volume of water 750 ml.

Then the catalyst TAA-EGK-NO, 0.015 g was mixed with 160 ml of 1.2% $ClO_2$ solution and mixed with the pulp slurry. Time taken for depletion of chlorine dioxide was 80 seconds. The yellow color of chlorine dioxide fades away indicating depletion. The final pH was 8.50 and the final temperature was 28° C. Pulp consistency 5.2%. Volume of water 910 ml. Catalyst concentration 0.0766 meq/liter.

Catalytic Stage 2

To the pulp slurry maintained at 28-34° C. was added 1.50 g of sodium hydroxide and mixed well. The initial pH was 9.92 and temperature was 28° C.

Then the catalyst TAA-EGK-NO, 0.015 g was mixed with 160 ml of 1.2% $ClO_2$ solution and mixed with the pulp slurry. Time taken for depletion of chlorine dioxide was 45 seconds. The yellow color of chlorine dioxide fades away indicating depletion. The final pH was 8.81 and the final temperature was 28° C. Pulp consistency 4.4%. Volume of water 1070 ml. Catalyst concentration 0.1304 meq/liter.

Catalytic Stage 3

To the pulp slurry maintained at 28-34° C. was added 1.5 g of sodium hydroxide and mixed well. The initial pH was 9.97 and temperature was 28° C.

Then the catalyst TAA-EGK-NO, 0.015 g was mixed with 160 ml of 1.2% $ClO_2$ solution and mixed with the pulp slurry. Time taken for depletion of chlorine dioxide was 36 seconds. The yellow color of chlorine dioxide fades away indicating depletion. The final pH was 9.02 and the final temperature was 28° C. Pulp consistency 3.9%. Volume of water 1230 ml. Catalyst concentration 0.1701 meq/liter.

Catalytic Stage 4

To the pulp slurry maintained at 28-34° C. was added 1.25 g of sodium hydroxide and mixed well. The initial pH was 9.88 and temperature was 28° C.

Then the catalyst TAA-EGK-NO, 0.015 g was mixed with 160 ml of 1.2% $ClO_2$ solution and mixed with the pulp slurry. Time taken for depletion of chlorine dioxide was 47 seconds. The yellow color of chlorine dioxide fades away indicating depletion. The final pH was 8.61 and the final temperature was 28° C. Pulp consistency 3.5%. Volume of water 1390 ml. Catalyst concentration 0.2007 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for one hour 35° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 55.66 meq carboxyl/100 g of pulp fibers.

Example 8

CBXY-288

Catalytic Carboxylation of Mercerized NBSK Cellulose Pulp Fibers, Using Chlorine Dioxide/TAA-EGK-NO Catalyst, 4 Catalytic Stages and One Stabilization Stage Catalytic Stage 1

To NBSK pulp fibers mercerized in 18% sodium hydroxide solution at 35° C. for 30 minutes, 50.0 g OD of 10% consistency was added 300 ml of de ionized water containing 10.0 g of sodium bicarbonate and 2.0 g of sodium hydroxide. The pulp slurry was maintained at 28-34° C. The initial temperature of the pulp slurry was 32° C. The initial pH was 10.16. Pulp consistency 6.3%. Volume of water 750 ml.

Then the catalyst TAA-EGK-NO, 0.015 g was mixed with 150 ml of 1.2% $ClO_2$ solution and mixed with the pulp slurry. Time taken for depletion of chlorine dioxide was 24 seconds. The yellow color of chlorine dioxide fades away indicating depletion. The final pH was 9.52 and the final temperature was 31° C. Pulp consistency 5.3%. Volume of water 900 ml. Catalyst concentration 0.0775 meq/liter.

Catalytic Stage 2

To the pulp slurry maintained at 28-34° C. was added 1.75 g of sodium hydroxide and mixed well. The initial pH was 10.23 and temperature was 31° C.

Then the catalyst TAA-EGK-NO, 0.015 g was mixed with 150 ml of 1.2% $ClO_2$ solution and mixed with the pulp slurry. Time taken for depletion of chlorine dioxide was 20 seconds. The yellow color of chlorine dioxide fades away indicating depletion. The final pH was 9.74 and the final temperature was 31° C. Pulp consistency 4.5%. Volume of water 1050 ml. Catalyst concentration 0.1328 meq/liter.

Catalytic Stage 3

To the pulp slurry maintained at 28-34° C. was added 1.25 g of sodium hydroxide and mixed well. The initial pH was 10.22 and temperature was 31° C.

Then the catalyst TAA-EGK-NO, 0.015 g was mixed with 150 ml of 1.2% $ClO_2$ solution and mixed with the pulp slurry. Time taken for depletion of chlorine dioxide was 20 seconds. The yellow color of chlorine dioxide fades away indicating depletion. The final pH was 9.73 and the final temperature was 32° C. Pulp consistency 4.0%. Volume of water 1200 ml. Catalyst concentration 0.1744 meq/liter.

Catalytic Stage 4

To the pulp slurry maintained at 28-34° C. was added 1.25 g of sodium hydroxide and mixed well. The initial pH was 10.14 and temperature was 33° C.

Then the catalyst TAA-EGK-NO, 0.015 g was mixed with 150 ml of 1.2% $ClO_2$ solution and mixed with the pulp slurry. Time taken for depletion of chlorine dioxide was 20 seconds. The yellow color of chlorine dioxide fades away indicating depletion. The final pH was 9.68 and the final temperature was 32° C. Pulp consistency 3.6%. Volume of water 1350 ml. Catalyst concentration 0.2067 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for one hour at 35° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 46.29 meq carboxyl/100 g of pulp fibers.

Example 9

CBXY-290

Catalytic Carboxylation of Mercerized NBSK Cellulose Pulp Fibers, Using Chlorine Dioxide/TAA-EGK-NO Catalyst, 4 Catalytic Stages and One Stabilization Stage Catalytic Stage 1

To NBSK pulp fibers mercerized in 9.4% sodium hydroxide solution at 35° C. for 30 minutes, 50.0 g OD of 10% consistency was added 300 ml of de ionized water containing 14.0 g of sodium bicarbonate and 3.0 g of sodium hydroxide. The pulp slurry was maintained at 28-34° C. The initial temperature of the pulp slurry was 31° C. The initial pH was 10.08. Pulp consistency 6.3%. Volume of water 750 ml.

Then the catalyst TAA-EGK-NO, 0.015 g was mixed with 150 ml of 1.2% $ClO_2$ solution and mixed with the pulp slurry. Time taken for depletion of chlorine dioxide was 25 seconds. The yellow color of chlorine dioxide fades away indicating depletion. The final pH was 9.63 and the final temperature was 32° C. Pulp consistency 5.3%. Volume of water 900 ml. Catalyst concentration 0.0775 meq/liter.

Catalytic Stage 2

To the pulp slurry maintained at 28-34° C. was added 1.0 g of sodium hydroxide and mixed well. The initial pH was 10.00 and temperature was 32° C.

Then the catalyst TAA-EGK-NO, 0.015 g was mixed with 150 ml of 1.2% $ClO_2$ solution and mixed with the pulp slurry. Time taken for depletion of chlorine dioxide was 22 seconds.

The yellow color of chlorine dioxide fades away indicating depletion. The final pH was 9.56 and the final temperature was 30° C. Pulp consistency 4.5%. Volume of water 1050 ml. Catalyst concentration 0.1328 meq/liter.

Catalytic Stage 3

To the pulp slurry maintained at 28-34° C. was added 1.0 g of sodium hydroxide and mixed well. The initial pH was 9.83 and temperature was 33° C.

Then the catalyst TAA-EGK-NO, 0.015 g was mixed with 150 ml of 1.2% $ClO_2$ solution and mixed with the pulp slurry. Time taken for depletion of chlorine dioxide was 23 seconds. The yellow color of chlorine dioxide fades away indicating depletion. The final pH was 9.45 and the final temperature was 30° C. Pulp consistency 4.0%. Volume of water 1200 ml. Catalyst concentration 0.1744 meq/liter.

Catalytic Stage 4

To the pulp slurry maintained at 28-34° C. was added 1.00 g of sodium hydroxide and mixed well. The initial pH was 9.76 and temperature was 31° C.

Then the catalyst TAA-EGK-NO, 0.015 g was mixed with 150 ml of 1.2% $ClO_2$ solution and mixed with the pulp slurry. Time taken for depletion of chlorine dioxide was 23 seconds. The yellow color of chlorine dioxide fades away indicating depletion. The final pH was 9.45 and the final temperature was 30° C. Pulp consistency 3.6%. Volume of water 1350 ml. Catalyst concentration 0.2067 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for one hour at 35° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 46.73 meq carboxyl/100 g of pulp fibers.

Example 10

CBXY-312

Catalytic Carboxylation of Mercerized NBSK Cellulose Pulp Fibers, Using Chlorine Dioxide/TAA-EGK-NO Catalyst, 4 Catalytic Stages and One Stabilization Stage Catalytic Stage 1

To NBSK pulp fibers mercerized in 16% sodium hydroxide solution at 25° C. for 12 hours, 50.0 g OD of 10% consistency was added 300 ml of de ionized water containing 8.0 g of sodium bicarbonate and 1.25 g of sodium hydroxide. The pulp slurry was maintained at 28-34° C. The initial temperature of the pulp slurry was 29° C. The initial pH was 9.95. Pulp consistency 6.3%. Volume of water 750 ml.

Then the catalyst TAA-EGK-NO, 0.015 g was mixed with 170 ml of 1.2% $ClO_2$ solution and mixed with the pulp slurry. Time taken for depletion of chlorine dioxide was 50 seconds. The yellow color of chlorine dioxide fades away indicating depletion. The final pH was 8.93 and the final temperature was 27° C. Pulp consistency 5.1%. Volume of water 920 ml. Catalyst concentration 0.0758 meq/liter.

Catalytic Stage 2

To the pulp slurry maintained at 28-34° C. was added 1.5 g of sodium hydroxide and mixed well. The initial pH was 10.01 and temperature was 29° C.

Then the catalyst TAA-EGK-NO, 0.015 g was mixed with 170 ml of 1.2% $ClO_2$ solution and mixed with the pulp slurry. Time taken for depletion of chlorine dioxide was 38 seconds. The yellow color of chlorine dioxide fades away indicating depletion. The final pH was 9.07 and the final temperature was 29° C. Pulp consistency 4.4%. Volume of water 1090 ml. Catalyst concentration 0.1280 meq/liter.

Catalytic Stage 3

To the pulp slurry maintained at 28-34° C. was added 1.5 g of sodium hydroxide and mixed well. The initial pH was 10.05 and temperature was 29° C.

Then the catalyst TAA-EGK-NO, 0.015 g was mixed with 170 ml of 1.2% $ClO_2$ solution and mixed with the pulp slurry. Time taken for depletion of chlorine dioxide was 40 seconds. The yellow color of chlorine dioxide fades away indicating depletion. The final pH was 9.01 and the final temperature was 29° C. Pulp consistency 3.8%. Volume of water 1260 ml. Catalyst concentration 0.1661 meq/liter.

Catalytic Stage 4

To the pulp slurry maintained at 28-34° C. was added 1.25 g of sodium hydroxide and mixed well. The initial pH was 9.88 and temperature was 28° C.

Then the catalyst TAA-EGK-NO, 0.015 g was mixed with 170 ml of 1.2% $ClO_2$ solution and mixed with the pulp slurry. Time taken for depletion of chlorine dioxide was 48 seconds. The yellow color of chlorine dioxide fades away indicating depletion. The final pH was 8.74 and the final temperature was 29° C. Pulp consistency 3.4%. Volume of water 1430 ml. Catalyst concentration 0.1951 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for three hours at 30° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 57.76 meq carboxyl/100 g of pulp fibers.

Example 11

CBXY-376

Catalytic Carboxylation of Mercerized NBSK Cellulose Pulp Fibers Using Sodium Hypochlorite/Sodium Bromide/TEMPO Catalyst, 4 Catalytic Stages and One Stabilization Stage Catalytic Stage 1

NBSK pulp fibers mercerized in 14% sodium hydroxide solution at 70° C. for 30 minutes, 50.0 g OD of 10% consistency was placed in 2400 ml aqueous buffer solution containing 9.0 g of sodium bicarbonate and 7.5 g of sodium carbonate maintained at 50° C. and pH of 9.5-10. TEMPO catalyst 0.04 g, sodium bromide 0.15 g and 50.0 ml of 3.5% sodium hypochlorite were added and mixed for 2 minutes Catalytic Stage 2

To the pulp slurry maintained at pH 9.5-10 a second addition of TEMPO catalyst 0.04 g, sodium bromide 0.15 g and 50.0 ml of 3.5% sodium hypochlorite was performed and mixed for 2 minutes.

Catalytic Stage 3

To the pulp slurry maintained at pH 9.5-10 a third addition of TEMPO catalyst 0.04 g, sodium bromide 0.15 g and 50.0 ml of 3.5% sodium hypochlorite was performed and mixed for 2 minutes.

Catalytic Stage 4

To the pulp slurry maintained at pH 9.5-10 a fourth addition of TEMPO catalyst 0.04 g, sodium bromide 0.15 g and 50.0 ml of 3.5% sodium hypochlorite was performed and mixed for 2 minutes.

Stabilization Stage

The pulp slurry was acidified to pH 2.5-3.5 and maintained at 50° C. Sodium chlorite 12.0 g and 5.0 ml of 50% hydrogen peroxide were added to the slurry and mixed well. The slurry was mixed for one hour at 50° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 71.06 meq carboxyl/100 g of pulp fibers.

Example 12

CBXY 400

Catalytic Carboxylation of SBSK Cellulose Pulp Fibers with Mercerization, Using Chlorine Dioxide/Chlorine/TAA-EGK-NO, 4 Catalytic Stages and One Stabilization Stage Catalytic Stage 1

To SBSK pulp fibers mercerized in 14.2% sodium hydroxide solution at 70° C. for 30 minutes, 50.0 g OD of 10% consistency from above procedure was added 200 ml of de ionized water containing 8.0 g of sodium bicarbonate and 2.25 g of sodium hydroxide. The pulp slurry was maintained at 28-34° C. The initial temperature of the pulp slurry was 31° C. The initial pH was 10.10. Pulp consistency 7.1%. Volume of water 650 ml.

Then the catalyst TAA-EGK-NO, 0.015 g was mixed with 215 ml of 0.81% $ClO_2$ solution containing 0.23% chlorine and mixed with the pulp slurry. Time taken for depletion of chlorine dioxide was 28 seconds. The yellow color of chlorine dioxide fades away indicating depletion. The final pH was 9.22 and the final temperature was 31° C. Pulp consistency 5.5%. Volume of water 865 ml. Catalyst concentration 0.0806 meq/liter.

Catalytic Stage 2

To the pulp slurry maintained at 28-34° C. was added 1.75 g of sodium hydroxide and mixed well. The initial pH was 10.13 and temperature was 32° C.

Then the catalyst TAA-EGK-NO, 0.015 g was mixed with 215 ml of 0.81% $ClO_2$ solution containing 0.23% chlorine and mixed with the pulp slurry. Time taken for depletion of chlorine dioxide was 26 seconds. The yellow color of chlorine dioxide fades away indicating depletion. The final pH was 9.20 and the final temperature was 32° C. Pulp consistency 4.4%. Volume of water 1080 ml. Catalyst concentration 0.1291 meq/liter.

Catalytic Stage 3

To the pulp slurry maintained at 28-34° C. was added 1.75 g of sodium hydroxide and mixed well. The initial pH was 10.10 and temperature was 32° C.

Then the catalyst TAA-EGK-NO, 0.015 g was mixed with 215 ml of 0.81% $ClO_2$ solution containing 0.23% chlorine and mixed with the pulp slurry. Time taken for depletion of chlorine dioxide was 37 seconds. The yellow color of chlorine dioxide fades away indicating depletion. The final pH was 9.26 and the final temperature was 31° C. Pulp consistency 3.7%. Volume of water 1295 ml. Catalyst concentration 0.0268 meq/liter.

Catalytic Stage 4

To the pulp slurry maintained at 28-34° C. was added 1.75 g of sodium hydroxide and mixed well. The initial pH was 10.05 and temperature was 33° C.

Then the catalyst TAA-EGK-NO, 0.015 g was mixed with 215 ml of 0.81% $ClO_2$ solution containing 0.23% chlorine and mixed with the pulp slurry. Time taken for depletion of chlorine dioxide was 40 seconds. The yellow color of chlorine dioxide fades away indicating depletion. The final pH was 9.02 and the final temperature was 33° C. Pulp consistency 3.2%. Volume of water 1510 ml. Catalyst concentration 0.1848 meq/liter.

Stabilization Stage

The pulp slurry was acidified to pH 2.0-3.0 and maintained at 60° C. Hydrogen peroxide (50%) 5.0 ml was added to the slurry and mixed well. The slurry was mixed for 12 hours at 25° C.

Neutralization Stage

The acidic pulp slurry was neutralized and made alkaline to pH 8-9.5 by addition of 10% sodium hydroxide solution with mixing. The pulp slurry was dewatered by filtration under reduced pressure. The pulp was redispersed in 2 liters of deionized water and filtered again to remove excess salts. Carboxyl determination gave 61.24 meq carboxyl/100 g of pulp fibers.

Tables 1-3 display results of representative catalytic carboxylation experiments embodying the methods and concepts discussed above. Table 1 displays results of representative experiments in which TAA-EKG-NO is used as the precursor, and in which chlorine dioxide is used as the secondary oxidant. Each experiment included a stabilization step, using one or more of hydrogen peroxide and sulfuric acid as the stabilizing agent. Table 1 includes Examples 7-10 presented above.

TABLE 1

Catalytic Carboxylation of Bleached and Mercerized Cellulose Fibers with $ClO_2$ Using TAA-EGK-NO.

| Sample | Pulp Fibers | Initial volume of Water Catalytic carboxylation | NaHCO$_3$ NaOH buffer initial pH | Temp °C. | TAA-EGK-NO % on fiber | ClO2 1 ml (%)/ pH final/ Time | ClO2 2 ml (%)/ pH final/ Time | ClO2 3 ml (%)/ pH final/ Time | ClO2 4 ml (%)/ pH final/ Time | Carboxyl meq/100 g |
|---|---|---|---|---|---|---|---|---|---|---|
| CBXY 287 | NBSK 50 g mercerized (in 17.8% NaOH at 40° C. for 30 min) | 720 ml | 10.02-10.41 | 30-32 | 0.03 with each addition of secondary oxidant | 150(1.2)/ 10.02 18 sec | 150(1.2)/ 9.46 20 sec | 150(1.2)/ 9.68 20 sec | 150(1.2)/ 9.18 20 sec | 47.81 |

TABLE 1-continued

Catalytic Carboxylation of Bleached and Mercerized Cellulose Fibers with ClO₂ Using TAA-EGK-NO.

| Sample | Pulp Fibers | Initial volume of Water Catalytic carboxylation | NaHCO₃ NaOH buffer initial pH | Temp °C. | TAA-EGK-NO % on fiber | ClO2 1 ml (%)/ pH final/ Time | ClO2 2 ml (%)/ pH final/ Time | ClO2 3 ml (%)/ pH final/ Time | ClO2 4 ml (%)/ pH final/ Time | Carboxyl meq/100 g |
|---|---|---|---|---|---|---|---|---|---|---|
| CBXY 288 | NBSK 50 g mercerized (in 18% NaOH at 40° C. for 30 min) | 720 ml | 10.14-10.23 | 31-32 | 0.03 with each addition of secondary oxidant | 150(1.2)/ 9.52 24 sec | 150(1.2)/ 9.74 20 sec | 150(1.2)/ 9.73 20 sec | 150(1.2)/ 9.68 20 sec | 46.29 |
| CBXY 290 | NBSK 50 g mercerized (in 9% NaOH at 40° C. for 30 min) | 720 ml | 9.76-10.08 | 31-33 | 0.03 with each addition of secondary oxidant | 150(1.2)/ 9.63 25 sec | 150(1.2)/ 9.56 22 sec | 150(1.2)/ 9.45 23 sec | 150(1.2)/ 9.35 23 sec | 46.73 |
| CBXY 291 | NBSK 50 g (not mercerized) | 720 ml | 9.83-9.94 | 30-32 | 0.03 with each addition of secondary oxidant | 150(1.2)/ 9.33 35 sec | 150(1.2)/ 9.41 25 sec | 150(1.2)/ 9.25 32 sec | 150(1.2)/ 9.16 32 sec | 39.31 |
| CBXY 293 | NBSK 50 g mercerized (in 17.8% NaOH at 70° C. for 30 min) | 720 ml | 9.87-10.04 | 29-32 | 0.03 with each addition of secondary oxidant | 150(1.2)/ 9.47 26 sec | 150(1.2)/ 9.11 30 sec | 150(1.2)/ 9.48 22 sec | 150(1.2)/ 9.27 26 sec | 54.82 |
| CBXY 294 | NBSK 50 g mercerized (in 15.2% NaOH at 70° C. for 30 min) | 720 ml | 9.88-10.08 | 29-31 | 0.03 with each addition of secondary oxidant | 170(1.2)/ 9.45 36 sec | 150(1.2)/ 9.27 29 sec | 150(1.2)/ 9.13 28 sec | 170(1.2)/ 9.20 33 sec | 51.62 |
| CBXY 295 | NBSK 50 g mercerized (in 16% NaOH at 70° C. for 30 min) | 720 ml | 9.50-9.90 | 28-30 | 0.03 with each addition of secondary oxidant | 150(1.2)/ 9.60 31 sec | 150(1.2)/ 9.35 27 sec | 150(1.2)/ 9.20 28 sec | 150(1.2)/ 8.96 36 sec | 57.27 |
| CBXY 296 | NBSK 50 g mercerized (in 18% NaOH at 70° C. for 30 min) | 720 ml | 9.67-9.99 | 27-30 | 0.03 with each addition of secondary oxidant | 150(1.2)/ 9.7627 sec | 150(1.2)/9. 6925 sec | 150(1.2)/ 9.5 824 sec | 150(1.2)/9. 4226 sec | 52.61 |
| CBXY 297 | NBSK 50 g (not mercerized) | 720 ml | 9.64-9.87 | 27-30 | 0.03 with each addition of secondary oxidant | 150(1.2)/ 9.28 42 sec | 150(1.2)/ 8.75 57 sec | 150(1.2)/ 9.17 38 sec | 150(1.2)/ 8.92 45 sec | 38.23 |
| CBXY 298 | NBSK 50 g mercerized (in 17% NaOH at 70° C. for 30 min) | 720 ml | 9.73-10.04 | 28-29 | 0.03 with each addition of secondary oxidant | 170(1.2)/ 8.28 90 sec | 170(1.2)/ 9.25 41 sec | 170(1.2)/ 8.59 52 sec | 170(1.2)/ 8.90 48 sec | 55.64 |
| CBXY 299 | NBSK 50 g mercerized (in 10% NaOH at 70° C. for 30 min) | 720 ml | 9.73-10.04 | 28-29 | 0.03 with each addition of secondary oxidant | 170(1.2)/ 9.23 45 sec | 170(1.2)/ 8.97 46 sec | 170(1.2)/ 8.71 49 sec | 170(1.2)/ 9.04 50 sec | 47.08 |
| CBXY 300 | NBSK 50 g mercerized (in 17% NaOH at 25° C. for 36 hours) | 720 ml | 9.71-9.97 | 28-29 | 0.03 with each addition of secondary oxidant | 160(1.2)/ 9.23 45 sec | 160(1.2)/ 8.97 46 sec | 160(1.2)/ 8.71 49 sec | 160(1.2)/ 9.04 50 sec | 55.66 |
| CBXY 303 | NBSK 50 g (not mercerized) | 720 ml | 10.01-10.05 | 27-29 | 0.03 with each addition of secondary oxidant | 150(1.2)/ 9.33 37 sec | 150(1.2)/ 8.32 31 sec | 150(1.2)/ 9.25 34 sec | 150(1.2)/ 9.33 32 sec | 40.57 |

TABLE 1-continued

Catalytic Carboxylation of Bleached and Mercerized Cellulose Fibers with $ClO_2$ Using TAA-EGK-NO.

| Sample | Pulp Fibers | Initial volume of Water Catalytic carbox-ylation | NaHCO$_3$ NaOH buffer initial pH | Temp °C. | TAA-EGK-NO % on fiber | ClO2 1 ml (%)/ pH final/ Time | ClO2 2 ml (%)/ pH final/ Time | ClO2 3 ml (%)/ pH final/ Time | ClO2 4 ml (%)/ pH final/ Time | Carboxyl meq/100 g |
|---|---|---|---|---|---|---|---|---|---|---|
| CBXY 305 | NBSK 50 g mercerized (in 15.8% NaOH at 25° C. for 72 hours) | 720 ml | 10.02-10.07 | 28-30 | 0.03 with each addition of secondary oxidant | 170(1.2)/ 9.15 40 sec | 170(1.2)/ 9.22 35 sec | 170(1.2)/ 9.21 32 sec | 170(1.2)/ 9.21 30 sec | 56.19 |
| CBXY 306 | NBSK 50 g (not mercerized) | 720 ml | 9.91-10.08 | 28-30 | 0.03 with each addition of secondary oxidant | 150(1.2)/ 9.43 37 sec | 150(1.2)/ 9.32 38 sec | 150(1.2)/ 9.35 32 sec | 150(1.2)/ 9.48 28 sec | 36.6 |
| CBXY 312 | NBSK 50 g mercerized (in 15.8% NaOH at 25° C. for 12 hours) | 720 ml | 9.88-10.05 | 27-29 | 0.03 with each addition of secondary oxidant | 170(1.2)/ 8.9350 sec | 170(1.2)/9.0738 sec | 170(1.2)/ 9.0 140 sec | 170(1.2)/8.7448 sec | 57.76 |

Table 2 displays results of representative experiments in which TAA-EKG-NO is used as the precursor, and in which a mixture of chlorine dioxide and chlorine is used as the secondary oxidant. Each experiment included a stabilization step, using one or more of hydrogen peroxide and sulfuric acid as the stabilizing agent. Table 2 includes Examples 1-5 and 12 presented above.

TABLE 2

Catalytic Carboxylation of Bleached and Mercerized Cellulose Fibers with $ClO_2$ and Chlorine Using TAA-EGK-NO.

| Sample | Pulp Fibers | Initial volume of Water Catalytic carbox-ylation | NaHCO$_3$ NaOH buffer initial pH | Temp °C. | TAA-EGK-NO % on fiber | ClO$_2$ 1 ml (%), Cl$_2$ ml (%)/ pH final/ Time | ClO$_2$ 2 ml (%), Cl$_2$ ml (%)/ pH final/ Time | ClO$_2$ 3 ml (%), Cl$_2$ ml (%)/ pH final/ Time | ClO$_2$ 4 ml (%), Cl$_2$ ml (%)/ pH final/ Time | Carboxyl meq/100 g |
|---|---|---|---|---|---|---|---|---|---|---|
| CBXY 348 | NBSK 50 g mercerized (in 15% NaOH at 70° C. for 30 min) | 720 ml | 10.08-10.20 | 31-32 | 0.03 with each addition of secondary oxidant | 200(0.87) 200(0.21)/ 9.48 30 sec | 200(0.87) 200(0.21)/ 9.46 23 sec | 200(0.87) 200(0.21)/ 9.26 32 sec | 200(0.87) 200(0.21)/ 9.42 30 sec | 65.85 |
| CBXY 349 | NBSK 50 g mercerized (in 15% NaOH at 50° C. for 30 min) | 720 ml | 10.10-10.18 | 29-31 | 0.03 with each addition of secondary oxidant | 205(0.86) 205(0.21)/ 9.35 30 sec | 205(0.86) 205(0.21)/ 9.38 30 sec | 205(0.86) 205(0.21)/ 9.30 32 sec | 205(0.86) 205(0.21)/ 9.36 32 sec | 69.98 |
| CBXY 350 | NBSK 50 g mercerized (in 15% NaOH at 50° C. for 15 min) | 720 ml | 10.14-10.17 | 29-32 | 0.03 with each addition of secondary oxidant | 220(0.80) 220(0.24)/ 9.40 35 sec | 220(0.80) 220(0.24)/ 9.25 36 sec | 220(0.80) 220(0.24)/ 9.26 37 sec | 220(0.80) 220(0.24)/ 9.22 45 sec | 71.06 |
| CBXY 351 | NBSK 50 g mercerized (in 15% NaOH at 70° C. for 30 min) | 720 ml | 10.02-10.19 | 29-32 | 0.03 with each addition of secondary oxidant | 175(0.86) 175(0.21)/ 9.59 25 sec | 175(0.86) 175(0.21)/ 9.35 27 sec | 175(0.86) 175(0.21)/ 9.31 28 sec | 175(0.86) 175(0.21)/ 9.30 28 sec | 61.99 |
| CBXY 352 | NBSK 50 g mercerized (in 15% NaOH at 70° C. for 30 min) | 720 ml | 10.06-10.26 | 28-32 | 0.03 with each addition of secondary oxidant | 205(0.86) 205(0.20)/ 9.43 36 sec | 205(0.86) 205(0.20)/ 9.37 30 sec | 205(0.86) 205(0.20)/ 9.18 30 sec | | 57.94 |

TABLE 2-continued

Catalytic Carboxylation of Bleached and Mercerized Cellulose Fibers with ClO₂ and Chlorine Using TAA-EGK-NO.

| Sample | Pulp Fibers | Initial volume of Water Catalytic carboxylation | NaHCO₃ NaOH buffer initial pH | Temp °C. | TAA-EGK-NO % on fiber | ClO₂ 1 ml (%), Cl₂ ml (%)/ pH final/ Time | ClO₂ 2 ml (%), Cl₂ ml (%)/ pH final/ Time | ClO₂ 3 ml (%), Cl₂ ml (%)/ pH final/ Time | ClO₂ 4 ml (%), Cl₂ ml (%)/ pH final/ Time | Carboxyl meq/100 g |
|---|---|---|---|---|---|---|---|---|---|---|
| CBXY 353 | NBSK 50 g mercerized (in 15% NaOH at 70° C. for 30 min) | 720 ml | 10.07-10.28 | 30-31 | 0.03 with each addition of secondary oxidant | 205(0.86) 205(0.21)/ 9.71 21 sec | 205(0.86) 205(0.21)/ 9.46 31 sec | | | 36.18 |
| CBXY 354 | NBSK 50 g mercerized (in 15% NaOH at 70° C. for 30 min) | 720 ml | 10.16 | 29-30 | 0.03 with each addition of secondary oxidant | 205(0.86) 205(0.21)/ 9.56 24 sec | | | | 22.44 |
| CBXY 383 | NBSK 50 g mercerized in once recycled NaOH solution (in 15% NaOH at 50° C. for 30 min) | 720 ml | 9.99-10.09 | 28-29 | 0.03 with each addition of secondary oxidant | 300(0.59) 300(0.36)/ 9.47 31 sec | 300(0.59) 300(0.36)/ 9.36 33 sec | 300(0.59) 300(0.36)/ 9.39 32 sec | 300(0.59) 300(0.36)/ 9.46 34 sec | 60.9 |
| CBXY 385 | NBSK 50 g mercerized in three times recycled NaOH solution (in 16% NaOH at 50° C. for 30 min) | 720 ml | 10.05-10.14 | 31-33 | 0.03 with each addition of secondary oxidant | 150(1.01) 150(0.28)/ 9.38 29 sec | 150(1.01) 150(0.28)/ 9.37 25 sec | 150(1.01) 150(0.28)/ 9.33 27 sec | 150(1.01) 150(0.28)/ 9.41 28 sec | 71.19 |
| CBXY 387 (1, 2, 3 and 4th additions) | NBSK 50 g mercerized (in 15% NaOH at 50° C. for 30 min) | 720 ml | 10.02-10.17 | 31-34 | 0.03 with each addition of secondary oxidant | ClO₂ 1 ml (%), Cl2 ml (%) 150(1.01) 150(0.28)/ 9.38 29 sec | ClO₂ 2 ml (%), Cl2 ml (%) 150(1.01) 150(0.28)/ 9.37 25 sec | ClO₂ 3 ml (%), Cl2 ml (%) 150(1.01) 150(0.28)/ 9.33 27 sec | ClO₂ 4 ml (%), Cl2 ml (%) 150(1.01) 150(0.28)/ 9.41 28 sec | |
| CBXY 387 (5, 6, 7 and 8th additions) | | | | | 0.03 with each addition of secondary oxidant | ClO₂ 5 ml (%), Cl2 ml (%) 150(1.01) 150(0.28)/ 9.38 29 sec | ClO₂ 6 ml (%), Cl2 ml (%) 150(1.01) 150(0.28)/ 9.37 25 sec | ClO₂ 7 ml (%), Cl2 ml (%) 150(1.01) 150(0.28)/ 9.33 27 sec | ClO₂ 8 ml (%), Cl2 ml (%) 150(1.01) 150(0.28)/ 9.41 28 sec | 96.14 |
| CBXY 369 | SBSK 50 g (not mercerized) | 720 ml | 10.27-10.28 | 30-32 | 0.03 with each addition of secondary oxidant | 280(0.61) 280(0.27)/ 9.28 70 sec | 280(0.61) 280(0.27)/ 9.26 80 sec | | | 32.88 |
| CBXY 394 | SBSK 50 g (not mercerized) | 650 ml | 9.99-10.09 | 28-30 | 0.03 with each addition of secondary oxidant | 230(0.71) 230(0.19)/ 9.47 31 sec | 230(0.71) 230(0.19)/ 9.36 33 sec | 230(0.71) 230(0.19)/ 9.39 32 sec | 230(0.71) 230(0.19)/ 9.46 34 sec | 44.43 |
| CBXY 400 | SBSK 50 g mercerized (in 14% NaOH at 70° C. for 30 min) | 650 ml | 10.05-10.13 | 31-33 | 0.03 with each addition of secondary oxidant | 215(0.81) 215(0.23)/ 9.22 28 sec | 215(0.81) 215(0.23)/ 9.20 26 sec | 215(0.81) 215(0.23)/ 9.14 28 sec | 215(0.81) 215(0.23)/ 9.02 40 sec | 61.24 |

Table 3 displays results of representative experiments in which TEMPO is used as the precursor, and in which a mixture of sodium hypochlorite and sodium bromide is used as a secondary oxidant. Each experiment included a stabilization step, using one or more of hydrogen peroxide and sulfuric acid as the stabilizing agent. Table 3 includes Example 11 presented above.

TABLE 3

Catalytic Carboxylation of Bleached and Mercerized Cellulose Fibers with Sodium Hypochlorite and Sodium Bromide Using TEMPO.

| Sample | Pulp Fibers | Initial volume of Water Catalytic carboxylation | $NaHCO_3$ NaOH buffer initial pH | Temp °C. | TEMPO % on fiber | NaOCl ml (%)/ NaBr (%)/ final Time | $ClO_2$ 2 ml (%), $Cl_2$ ml (%)/ pH final/ Time | $ClO_2$ 3 ml (%), $Cl_2$ ml (%)/ pH final/ Time | $ClO_2$ 4 ml (%), $Cl_2$ ml (%)/ pH final/ Time | Carboxyl meq/100 g |
|---|---|---|---|---|---|---|---|---|---|---|
| CBXY 376 | NBSK 50 g mercerized (in 14% NaOH at 70° C. for 30 min) | 2400 ml | 9.0-10.0 | 50 | 0.08 with each addition of Secondary oxidant | 50(3.5)/ (0.3)/ 2 minutes | 50(3.5)/ (0.3)/ 2 minutes | 50(3.5)/ (0.3)/ 2 minutes | 50(3.5)/ (0.3)/ 2 minutes | 96.44 |
| CBXY 379 | NBSK 50 g (not mercerized) | 2400 ml | 9.0-10.0 | 50 | 0.08 with each addition of Secondary oxidant | 50(3.5)/ (0.3)/ 2 minutes | 50(3.5)/ (0.3)/ 2 minutes | 50(3.5)/ (0.3)/ 2 minutes | 50(3.5)/ (0.3)/ 2 minutes | 51.56 |

Illustrative, non-exclusive examples of descriptions of some compositions and methods in accordance with the scope of the present disclosure are presented in the following numbered paragraphs. The following paragraphs are not intended to be an exhaustive set of descriptions, and are not intended to define minimum or maximum scopes, or required elements or steps, of the present disclosure. Rather, they are provided as illustrative examples of selected compositions and methods that are within the scope of the present disclosure, with other descriptions of broader or narrower scopes, or combinations thereof, not specifically listed herein still being within the scope of the present disclosure.

A. A method of producing fibrous carboxylated cellulose, the method including:

obtaining mercerized cellulose fibers;

carboxylating the mercerized cellulose fibers by catalytically carboxylating said fibers in an aqueous alkaline suspension in at least two catalytic carboxylation stages in which said stages are in series and each later stage further carboxylates the fibers from the previous stage;

wherein the first stage of the at least two catalytic carboxylation stages includes adjusting the pH of the fibers to 8-11, followed by providing amounts of a precursor of an active oxoammonium salt catalyst and a secondary oxidant adapted to generate the active catalyst sufficient to effect carboxylation;

wherein each subsequent stage of the at least two catalytic carboxylation stages includes adjusting the pH of the fibers to 8-11, followed by providing additional amounts of the precursor and the secondary oxidant sufficient to effect further carboxylation; and wherein the precursor is selected from the group consisting of heterocyclic nitroxides in which the carbon atoms adjacent the nitroxide nitrogen lack hydrogen substitution, their corresponding amines and hydroxylamines, and mixtures thereof, and is stable under aqueous alkaline conditions.

A.1. The method of paragraph A, wherein the precursor is one or more of TEMPO and TAA-EGK-NO.

A.2. The method of paragraph A or A.1, wherein the secondary oxidant is one or more of chlorine dioxide, chlorine, sodium hypochlorite and sodium bromide.

A.3. The method of any of paragraphs A through A.2, in which the time in each of the at least two catalytic carboxylation stages is about 10 seconds to 5 minutes.

A.4. The method of any of paragraphs A through A.3, further including:

subsequent to the last stage of the at least two catalytic carboxylation stages, stabilizing the carboxylated fibers by treating the fibers with a stabilizing agent under conditions adapted to convert aldehyde groups present in the fibers to carboxyl groups.

A.4.1 The method of paragraph A.4, wherein the stabilizing agent includes one or more tertiary oxidizers selected from a group consisting of a peroxide, a chlorite, and an acid.

A.4.2. The method of paragraph A.4 of A.4.1, wherein the stabilizing agent includes one or more of sodium chlorite, hydrogen peroxide, and sulfuric acid.

A.4.3. The method of any of paragraphs A.4 through A.4.2, wherein the stabilizing is performed at a pH of about 1.0-3.5.

A.4.4. The method of any of paragraphs A.4 through A.4.3, wherein the stabilizing is performed at about 40-70° C.

A.4.5. The method of any of paragraphs A.4 through A.4.4, wherein the stabilizing is performed over a period of about 30 minutes to 2 hours.

A.5. The method of any of paragraphs A.4 through A.4.5, wherein the obtaining further includes mercerizing native cellulose fibers to obtain mercerized cellulose that includes at least 20% cellulose II.

A.5.1. The method of paragraph A.5, wherein the mercerizing includes treating one or more of native NBSK and native SBSK cellulose fibers in aqueous sodium hydroxide concentrations of about 14-18%.

A.5.2. The method of paragraph A.5 or A.5.1, wherein the mercerizing is performed at a temperature of at least 50° C. over a period of about 5-30 minutes.

A.5.3. The method of any of paragraphs A.5 through A.5.2, wherein the native cellulose fibers are below about 4% consistency.

A.6. The fibrous carboxylated mercerized cellulose produced by the method of any of paragraphs A through A.5.3.

B. A stable fibrous carboxylated mercerized cellulose having at least 12 meq/100 g carboxyl substitution, wherein the carboxyl groups are located at the C-6 position of the anhydroglucose units.

B.1. The carboxylated mercerized cellulose of paragraph A.6 or B, wherein the mercerized cellulose includes at least 20% cellulose II.

B.2. The carboxylated mercerized cellulose of any of paragraphs A.6, B, or B.1, having at least 40 meq/100 g carboxyl substitution.

B.3. The carboxylated mercerized cellulose of any of paragraphs A.6 and B through B.2, having at least 80 meq/100 g carboxyl substitution.

B.4. The carboxylated mercerized cellulose of any of paragraphs A.6 and B through B.3, wherein the cellulose is substantially free of aldehyde groups.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

The invention claimed is:

1. A method of producing fibrous carboxylated cellulose, the method comprising:
   obtaining mercerized cellulose fibers;
   carboxylating the mercerized cellulose fibers by catalytically carboxylating said fibers in an aqueous alkaline suspension in at least two catalytic carboxylation stages, with each of said stages carried out in one of at least two corresponding catalytic carboxylation reactors, in which said stages and reactors are in series and each later stage and reactor further carboxylates the fibers from the previous stage and reactor;
   wherein the first stage of the at least two catalytic carboxylation stages is carried out in a first reactor and includes adjusting the pH of the fibers to 8-11, followed by providing amounts of a precursor of an active oxoammonium salt catalyst and a secondary oxidant adapted to generate the active catalyst sufficient to effect carboxylation;
   wherein each subsequent stage of the at least two catalytic carboxylation stages is carried out in a subsequent reactor and a includes adjusting the pH of the fibers to 8-11, followed by providing additional amounts of the precursor and the secondary oxidant sufficient to effect further carboxylation;
   wherein the time in each of the at least two catalytic carboxylation stages is about 10 seconds to 5 minutes; and
   wherein the precursor is selected from the group consisting of heterocyclic nitroxides in which the carbon atoms adjacent the nitroxide nitrogen lack hydrogen substitution, their corresponding amines and hydroxylamines, and mixtures thereof, and is stable under aqueous alkaline conditions.

2. The method of claim 1, wherein the obtaining further includes mercerizing native cellulose fibers to obtain mercerized cellulose that includes at least 20% cellulose II.

3. The method of claim 2, wherein the mercerizing includes treating one or more of native northern bleached softwood kraft and native southern bleached softwood kraft cellulose fibers in aqueous sodium hydroxide concentrations of about 14-18%.

4. The method of claim 3, wherein the mercerizing is performed at a temperature of at least 50° C. over a period of about 5-30 minutes.

5. The method of claim 3, wherein the native cellulose fibers are below about 4% consistency.

6. The method of claim 1, wherein the precursor is one or more of 2,2,6,6-tetramethylpiperidinyl-1-oxy free radical (TEMPO) and triacetoamine ethylene glycol ketal nitroxide (TAA-EGK-NO).

7. The method of claim 1, wherein the secondary oxidant is one or more of chlorine dioxide, chlorine, sodium hypochlorite and sodium bromide.

8. The method of claim 1, further including:
   subsequent to the last stage of the at least two catalytic carboxylation stages, stabilizing the carboxylated fibers by treating the fibers with a stabilizing agent under conditions adapted to convert aldehyde groups present in the fibers to carboxyl groups.

9. The method of claim 8, wherein the stabilizing agent includes one or more tertiary oxidizers selected from a group consisting of a peroxide, a chlorite, and an acid.

10. The method of claim 8, wherein the stabilizing agent includes one or more of sodium chlorite, hydrogen peroxide, and sulfuric acid.

11. The method of claim 8, wherein the stabilizing is performed at a pH of about 1.0-3.5.

12. The method of claim 11, wherein the stabilizing is performed at about 40-70° C.

13. The method of claim 11, wherein the stabilizing is performed over a period of about 30 minutes to 2 hours.

* * * * *